US009751557B2

United States Patent
Svensson et al.

(10) Patent No.: US 9,751,557 B2
(45) Date of Patent: Sep. 5, 2017

(54) METHOD AND A SYSTEM FOR ASSISTING A DRIVER OF A VEHICLE DURING OPERATION

(75) Inventors: Jan-Inge Svensson, Göteborg (SE); Jochen Pohl, Göteborg (SE); Sten Ragnhult, Onsala (SE); Johan Hultén, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 1257 days.

(21) Appl. No.: 13/381,227

(22) PCT Filed: Jun. 29, 2009

(86) PCT No.: PCT/SE2009/000338
§ 371 (c)(1),
(2), (4) Date: Jan. 20, 2012

(87) PCT Pub. No.: WO2011/002347
PCT Pub. Date: Jan. 6, 2011

(65) Prior Publication Data
US 2012/0109466 A1    May 3, 2012

(51) Int. Cl.
*B62D 5/04* (2006.01)
*B62D 6/00* (2006.01)
*B62D 5/00* (2006.01)

(52) U.S. Cl.
CPC ............ *B62D 6/008* (2013.01); *B62D 5/001* (2013.01); *B62D 5/0463* (2013.01)

(58) Field of Classification Search
USPC ............. 701/41–42; 180/400, 417, 419, 446, 180/443–444; 403/220; 267/273
See application file for complete search history.

(56) References Cited

U.S. PATENT DOCUMENTS 3,580,352 A * 5/1971 Hestad ................. B62D 5/006
180/402
3,666,301 A * 5/1972 Jorn ....................... F16F 1/387
267/282
4,241,804 A * 12/1980 Deininger ........... B62D 5/0439
180/445

(Continued)

FOREIGN PATENT DOCUMENTS

DE    2746919    * 10/1977    ........... B62D 5/0439
EP    1431160 A1    6/2004
(Continued)

OTHER PUBLICATIONS

Improvement of steering feel of Electric Power Steering system with Variable Gear Transmission System using decoupling control Morita, Y. et al.; Advanced Motion Control, 2008. AMC '08. 10th IEEE Inter. Workshop on; DOI: 10.1109/AMC.2008.4516103 Pub. Yr: 2008 , pp. 417-422.*

(Continued)

*Primary Examiner* — Cuong H Nguyen
(74) *Attorney, Agent, or Firm* — WRB-IP LLP

(57) ABSTRACT

A method is provided for assisting a driver of a vehicle during operation by providing the driver with a desired steering feel. The method includes determining a desired steering device guiding force including a part representing a desired friction in a steering arrangement, and providing the driver with the desired steering feel based on the determined steering device guiding force.

11 Claims, 3 Drawing Sheets

(56) References Cited

U.S. PATENT DOCUMENTS

| | | | |
|---|---|---|---|
| 6,053,274 A * | 4/2000 | Ehara et al. | 180/444 |
| 7,308,964 B2 * | 12/2007 | Hara et al. | 180/446 |
| 2001/0027364 A1 * | 10/2001 | Matsuoka | 701/41 |
| 2004/0148078 A1 * | 7/2004 | Nakano et al. | 701/41 |
| 2004/0148080 A1 * | 7/2004 | Ekmark | B62D 6/008 701/41 |
| 2004/0245041 A1 | 12/2004 | Fukuda et al. | |
| 2005/0067214 A1 | 3/2005 | Tanaka et al. | |
| 2005/0072621 A1 * | 4/2005 | Hara et al. | 180/444 |
| 2006/0086560 A1 * | 4/2006 | Furusho | B62D 5/0463 180/446 |
| 2006/0136108 A1 * | 6/2006 | Lin et al. | 701/41 |
| 2007/0144824 A1 | 6/2007 | Tamaki et al. | |
| 2008/0047775 A1 | 2/2008 | Yamazaki | |
| 2008/0087491 A1 * | 4/2008 | Ammon | B62D 6/008 180/426 |
| 2008/0243341 A1 * | 10/2008 | Hayama | B62D 5/001 701/42 |
| 2009/0024281 A1 | 1/2009 | Hwang | |

FOREIGN PATENT DOCUMENTS

| | | |
|---|---|---|
| EP | 1775188 A1 | 4/2007 |
| EP | 1939066 A1 | 7/2008 |
| EP | 1977953 A1 | 10/2008 |
| GB | 2386881 A | 10/2003 |
| JP | 2002166844 A2 | 6/2002 |
| JP | 2006007931 A2 | 1/2006 |
| JP | 2008197899 | 8/2008 |
| JP | 2008230537 A2 | 10/2008 |
| JP | 2008307910 A | 12/2008 |
| JP | 2009137516 A2 | 6/2009 |

OTHER PUBLICATIONS

Adaptive haptic feedback steering wheel for driving simulators; H Mohellebi, A Kheddar, S Espié—Vehicular Technology, IEEE . . . , 2009—ieeexplore.ieee.org.*

Motivation for continuous haptic gas pedal feedback to support car following; DA Abbink, ER Boer, M Mulder—Intelligent Vehicles . . . , 2008—ieeexplore.ieee.org.*

A robotic system for actively stiffening flexible manipulators; Paul M. Loschak; Stephen F. Burke; Emiko Zumbro; Alexandra R. Forelli; Robert D. Howe; 2015 IEEE/RSJ International Conference on Intelligent Robots and Systems (IROS); Year: 2015 pp. 216-221, DOI: 10.1109/IROS.2015.7353377.*

Designing Steering Feel for Steer-by-Wire Vehicles Using Objective Measures; Avinash Balachandran; J. Christian Gerdes IEEE/ASME Transactions on Mechatronics; Year: 2015, vol. 20, Issue: 1; pp. 373-383, DOI: 10.1109/TMECH.2014.2324593.*

Driver-assist steering by active front steering and differential braking: Design, implementation and experimental evaluation of a switched model predictive control approach; S. Di Cairano; H. E. Tseng; 49th IEEE Conference on Decision and Control (CDC) Year: 2010; MPages: 2886-2891, DOI: 10.1109/CDC.2010.5716954.*

Handling safety improvement for steer-by-wire vehicle using fuzzy controller; Naser Elmi; Behzad Samadi; Abdolreza Ohadi The 2nd International Conference on Control, Instrumentation and Automation; Year: 2011; pp. 144-149, DOI: 10.1109/ICCIAutom.2011.6356646.*

Adaptive Haptic Feedback Steering Wheel for Driving Simulators; Hakim Mohellebi; Abderrahmane Kheddar; StÉphane Espie; IEEE Transactions on Vehicular Technology; Year: 2009, vol. 58, Issue: 4; pp. 1654-1666, DOI: 10.1109/TVT.2008.2004493.*

Motivation for continuous haptic gas pedal feedback to support car following; David A. Abbink; Erwin R. Boer; Mark Mulder; 2008 IEEE Intelligent Vehicles Symposium; Year: 2008; pp. 283-290, DOI: 10.1109/IVS.2008.4621325.*

Supplementary European Search Report (Oct. 30, 2012) for corresponding European App. EP 09 84 6894.

Japanese Official Action(Aug. 15, 2013) from corresponding Japanese Application 2012-518506.

International Search Report for corresponding International Application PCT/SE2009/000338.

European Search Report (Apr. 10, 2014) for corresponding European App. EP 14 02 0091.

Japanese Official Action (translation) (Dec. 17, 2015) for corresponding Japanese App. 2012-518506.

* cited by examiner

METHOD AND A SYSTEM FOR ASSISTING A DRIVER OF A VEHICLE DURING OPERATION

BACKGROUND AND SUMMARY

The present invention relates to a method and a system for assisting a driver of a vehicle during operation by providing the driver with a desired steering feel.

It is known to provide the driver with a desired steering feel by applying a guiding force to the steering device based on different input parameters, such as steering device deflection, lateral acceleration, yaw rate and vehicle speed.

The guiding force exerted onto the steering device is resistive if counteracting the force applied by the driver onto the steering device, or supportive if acting in the same direction as the force applied by the driver onto the steering device, thus for instance reducing the effect of e.g. frictional forces acting on the wheels and the like which are experienced by the driver as resistance when operating the steering device.

The steering device is normally formed by a conventional steering wheel in the case of a vehicle. However, the invention is applicable to other steering devices, such as a joystick, a sliding nipple or any other suitable steering device for steering the vehicle. For instance, in the case that the steering device is a steering wheel, the guiding force will appear as a guiding torque exerted onto the steering wheel. Thus, in this case, the term steering feel denotes the steering wheel torque experienced by the driver during operation of the vehicle.

EP 1431160 discloses a system for estimating a steering wheel resist torque based on steering wheel rotation angle, vehicle speed and lateral acceleration or yaw rate. The steering wheel is connected to the road wheels via a steering shaft arrangement and the delivered steering wheel resist torque is measured and compared with the estimated steering wheel resist torque, whereupon the delivered steering wheel resist torque is adapted by use of a feedback controller to be substantially the same as the estimated steering wheel resist torque. It has turned out that this system in certain operations may be regarded as unsteady. Further, it has turned out that the steering feel is reduced when driving in long curves.

One object of the invention is to achieve a method for assisting a driver which creates conditions for an improved steering feel.

This object is achieved by the method defined in claim 1. Thus, it is achieved by the steps of:
 determining a desired steering device guiding force comprising a part representing a desired friction in a steering arrangement, and
 providing the driver with the desired steering feel based on the determined steering device guiding force.

The invention is based on the insight that a certain friction feel is desired, see further below. Preferably, the desired steering device guiding force represents a nominal, desired friction. Said term "steering arrangement" may be a nominal steering arrangement.

The determined desired steering device guiding force can be based on further information, such as further desired steering characteristics in addition to the friction component. Thus, the determined desired steering device guiding force may be a sum of desired forces (such as torque components).

Preferably, the vehicle comprises an actual steering arrangement comprising a manual steering device, at least one pair of ground engaging members and a mechanical connection between the manual steering device and said ground engaging members.

According to an example embodiment, the method comprises the step of providing the driver with the desired steering feel by applying a final steering device guiding force based on the desired steering device guiding force to a manually operated steering device. Said manually operated steering device is preferably formed by a steering wheel. The term "final" with regard to the steering device guiding force defines in this case that the actively supplied steering device guiding force does not necessarily equal the determined desired steering device guiding force. For example, the method comprises the step of determining an actual force to the steering device resulting from an actual vehicle steering arrangement during operation, and determining a value of a final steering device guiding force to be applied to the steering device by subtracting a value of the determined actual force from a value of the determined desired steering device guiding force.

Preferably, the actual force is formed by an actual torque to the steering wheel, which is determined via an elastic element, such as a torsion bar, in the steering arrangement.

Preferably, a steering torque is determined by measuring the twist of the torsion bar in the steering arrangement. More precisely, a first angular sensor is arranged at a first end of the torsion bar and a second angular sensor is arranged at a second end of the torsion bar (opposite the first end). The steering torque can be determined based on the relative angular movement (twist) of the torsion bar and the stiffness of the torsion bar. According to an alternative, one or several strain gauges may be used.

According to an example embodiment, the method comprises the step of at least suppressing a driver steering feel from the influence of friction in a steering arrangement in the vehicle, which is configured to steer at least one ground engaging member.

The suppression of the driver steering feel from the influence of friction in the steering arrangement is preferably accomplished via a so-called reference generator function or any other known means of friction compensation device or function.

The suppression of the driver steering feel from the influence of friction in the steering arrangement is preferably accomplished simultaneously as the application of the steering device guiding force.

Preferably a driver steering feel is decoupled from the influence of friction in the steering arrangement. Thus, the influence of friction in the steering arrangement is preferably completely removed.

This embodiment creates conditions for using an Electrical Power Assisted Steering (EPAS) system. Especially, the method is applicable in steering systems where there is a mechanical connection between the steering device and the ground but where the inherent steering feel resulting from the mechanical connection during operation is eliminated or at least suppressed.

For example, the inherent mechanical friction in the actual steering arrangement depends on different operational conditions, such as manufacturing tolerances, wear, temperature, age etc. Thus, the mechanical friction in the mechanical connection is different for different individual vehicles and varies over time. Thus, this embodiment creates conditions for decoupling the hardware (mechanical connection) from the friction steering feel. In other words, the embodiment creates conditions for an application-independent (hardware-independent) friction steering feel.

Preferably, the method comprises the step of determining a desired steering device guiding force (based on a vehicle state, such as a steering angle. The steering angle is preferably defined by a steering wheel deflection.

Preferably, the method comprises the step of applying the determined steering device guiding force to the steering arrangement and simultaneously at least suppressing steering device disturbances resulting from the mechanical interconnection.

Preferably, a delivered steering device guiding force is measured and compared with an estimated desired steering device guiding force, wherein the delivered steering device guiding force is adapted by use of a feedback controller to be substantially the same as the desired steering device guiding force through adapting the amount of said guiding force.

According to a further example embodiment, the method comprises the step of determining the steering device guiding force by means of at least one predetermined friction model of the desired friction in the vehicle steering arrangement. Preferably, the method comprises the step of applying the steering device guiding force to the steering arrangement by means of an actuator.

According to a further example embodiment, the friction model represents the friction between a flexible element and the steering device in the steering arrangement, wherein the flexible element is configured for a relative displacement in a circumferential direction about a steering axis, which displacement is generated between an upper and a lower shaft of the steering arrangement. This embodiment is based on the insight that this specifically defined friction is advantageous for the steering feel.

The displacement in the circumferential direction is generated between the upper and the lower shaft of the according to turn of the steering wheel with twist of the flexible element (torsion bar) interposed between the upper and lower shafts.

Friction in the upper steering column is desired due to the fact that:
friction dissipates energy and thus adds damping (in a non-linear manner) to the system,
a certain amount of friction reduces the drivers torque in long curves, the driver can so to say "rest his/her arms in friction", and
a steering system without friction is experienced as a pure spring.

According to a further example embodiment, the friction model is configured to not represent the friction between an actuator for applying the steering device guiding force to the steering device and the flexible element in the steering arrangement, but rather represent the desired amount of friction between steering wheel and the flexible device. This embodiment is based on the insight that only this specifically defined friction is advantageous for the steering feel.

Thus, friction in an electric power assisted steering system is distuinigshed into two separate categories, namely:
friction above the torsion bar, which (to a certain degree) is desired, and
friction between the electric actuator and the torsion bar, which is undesired from a control and stability point of view.

A further object of the invention is to achieve a system for assisting a driver which creates conditions for an improved steering feel.

This object is achieved by the method defined in claim 11. Thus, it is achieved by a system for assisting a driver of a vehicle during operation by providing the driver with a desired steering feel, characterized by a means for determining a desired steering device guiding force comprising a part representing a desired friction in a steering arrangement, and means for providing the driver with the desired steering feel based on the determined steering device guiding force.

According to an example embodiment, the system comprises a means for suppressing a driver steering feel from the influence of friction in a steering arrangement in the vehicle, which is configured to steer at least one ground engaging member.

According to a further example embodiment, said means for determining a desired steering device guiding force comprises at least one predetermined friction model of the desired friction in the vehicle steering arrangement.

According to a further example embodiment, the friction model represents the friction between a flexible element and the steering device in the steering arrangement, wherein the flexible element is configured for a relative displacement in a circumferential direction about a steering axis, which displacement is generated between an upper and a lower shaft of the steering arrangement.

Further example embodiments and advantages thereof emerge from the description below, the figures and the claims.

BRIEF DESCRIPTION OF FIGURES

The invention will be described in greater detail below with reference to the embodiment shown in the accompanying drawings, in which FIG. 1 schematically shows a system for performing the inventive method according to one embodiment.

DETAILED DESCRIPTION

Figure 1:
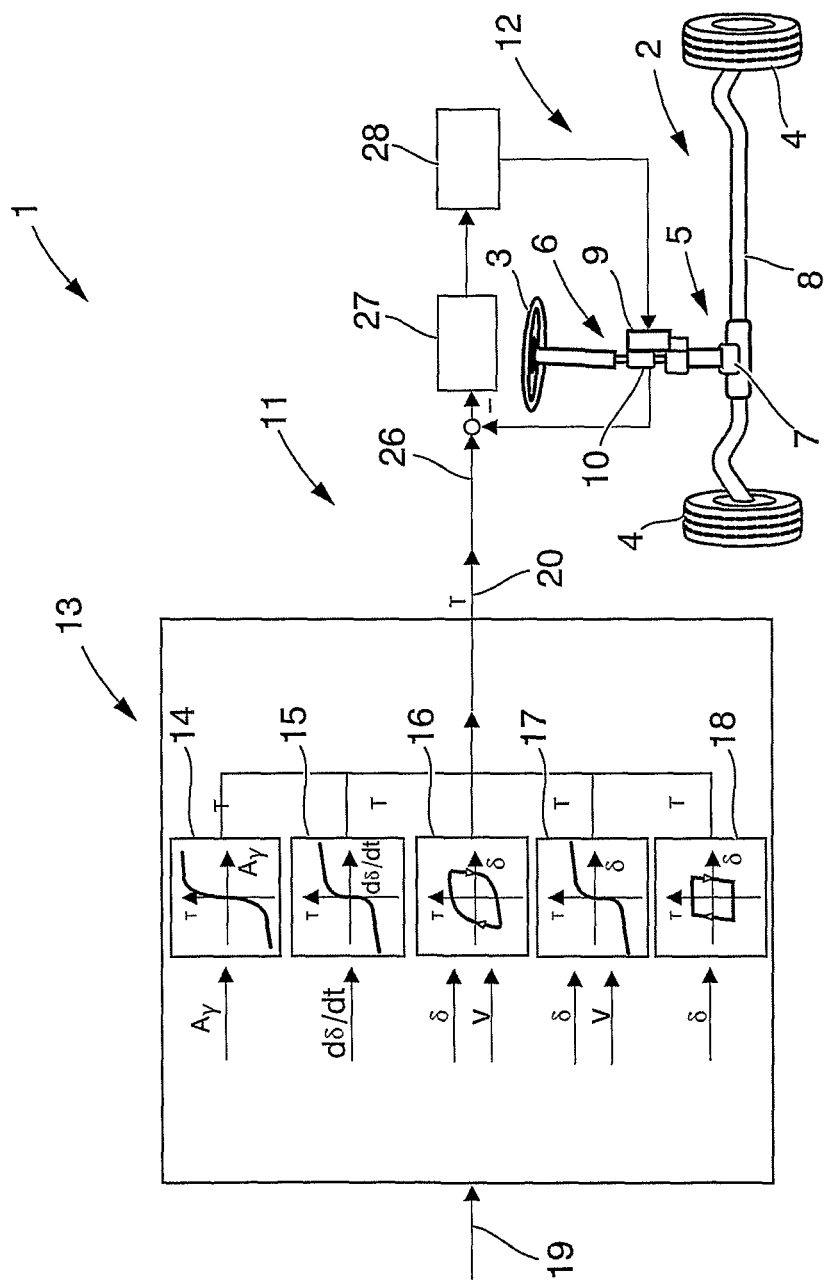

The invention is below described for application in a truck. However, the invention should not be regarded as limited to trucks, but it may be applied also in other vehicles, such as cars. FIG. 1 schematically shows a system 1 for performing a control method according to one embodiment. The system 1 comprises a mechanical steering arrangement 2, which may be of a conventional type. The mechanical steering arrangement 2 comprises a steering device 3 in the form of a steering wheel, at least one ground engagement member 4 in the form of a wheel and a mechanical connection 5 between the steering wheel 3 and the wheels 4 for transmission of steering signals from the steering wheel 3 to the wheels 4.

The steering wheel 3 is arranged in a vehicle passenger compartment and manually operated by the driver of the vehicle to steer the wheels 4. The steering arrangement 2 comprises a steering linkage means 6 extending from the steering wheel 3 down to a Hydraulic Power Assisted System (HPAS) 7 for converting angular rotation in the steering linkage 6 to a linear movement via a steering member 8. The steering linkage means 6 comprises an electric steering gear. The HPAS may be of conventional type comprising a hydraulic cylinder (not shown) and a torsion bar (not shown). The steering member 8 is coupled on opposite ends to a left and right wheel 4 and configured to turn the wheels 4 in response to steering signals from the steering wheel 3.

The system 1 further comprises an actuator 9 to provide supported adjustment of the steering angle. The actuator 9 is preferably formed by an electric motor.

The actuator 9 provides a guiding force, and more specifically a guiding torque, or assist torque, to the steering assembly for assisting the driver in steering the steering wheel. The electric motor may be arranged around a steering column in the steering arrangement 2, wherein the magnetic field acts directly on the steering column. Alternatively, the electric motor may be arranged beside the steering column and act on the steering column via a mechanical linkage, preferably via pinion gears.

The system 1 further comprises a torque-measuring device, or sensor, 10 for measuring a manual torque applied by the driver to the, steering wheel. The torque-measuring device 10 is of elastic constitution and preferably comprises a torsion bar. In other words, a steering wheel angle is measured via the torsion bar. More specifically, the electric steering gear comprises said torsion bar. In other words, the torque sensor 10 detects, as the steering torque applied to the steering wheel, a relative displacement in a circumferential direction which is generated between the upper and lower shafts of the steering shaft turning about the axis of the steering wheel according to turn of the steering wheel with twist of the torsion bar interposed between the upper and lower shafts.

The system 1 further comprises an Electrical Power Assisted Steering (EPAS) system 11. The EPAS 11 comprises a regulating loop 12, which is configured to achieve a torque-free steering. The regulating loop 12 is configured to receive an input signal indicative of a current steering torque in the steering wheel 3. The input signal is received from the torque-measuring device 10. Basically, the regulating loop 12 is configured to output a signal to the actuator 9 so that said torque free steering is achieved.

The regulating loop 12 comprises a controller, or regulator, 27 which comprises a filter function. The filter function may be based on an inverse model of the steering dynamics of the present vehicle. Further, the regulator 27 may be configured to reduce errors in the model and to reduce disturbances and measurement noise in order to reduce the risk of instability in the system.

The regulator 27 is configured to receive a signal indicative of a torque to be applied to the steering arrangement via the electric motor and in response thereto produce an output signal. The regulating loop 12 further comprises an electric motor control means 28, which is configured to receive the output signal indicative of a torque from the regulator 27 and produce a signal with a corresponding current value to the electric motor. According to an alternative, the regulator 27 and the electric motor control means 28 are combined in a single controller.

The EPAS further comprises a controlling function 13, below referred to as a reference generator, which is configured to determine a desired torque to be applied to the steering wheel in order to provide the driver with a desired steering feel. In other words, the reference generator describes a nominal vehicle.

Further, the reference generator 13 is operatively connected to the regulating loop 12 and outputs a signal indicative of a desired steering torque. The regulating loop is configured to compare the desired steering torque to the actual, current steering torque and continuously adapt the output signal to the actuator so that said desired steering torque is transmitted to the driver. In other words, the actuator is controlled so that it applies the difference in torque between the desired torque value from the reference generator and the current actual torque in the steering assembly so that the actual torque is controlled to substantially equal the desired torque.

The reference generator 13 comprises at least one steering device t guiding force operation model and in the example in FIG. 1 a plurality of guiding force operation models 14,15,16,17,18. The guiding force operation model preferably comprises a mathematical model. The model (s) is designed in a way to achieve a desired steering feel in the steering device. Thus, the model (s) can be designed in different ways for different vehicle types and/or for different desired steering feels.

Further, the model (s) comprises at least one desired steering characteristic parameter. More specifically, each model is configured to produce a guiding torque value T for one desired and predetermined steering characteristic parameter based on at least one input 19.

In other words, the steering characteristic parameter is a guiding force influencing operational parameter. Each model comprises a mathematical function, wherein the torque value is determined as a function of a value of the input, see illustrated examples of the functions in FIG. 1.

The individual torque values resulting from the models are summed up to a torque sum, which forms an output 20 from the reference generator. According to the shown embodiment, the reference generator comprises models for the following steering characteristic parameters: vehicle lateral acceleration, damping of steering device movements, tire friction, self alignment of the steering device to a neutral position and friction in the mechanical connection between the steering device and the wheels.

The signals input to the reference generator comprises a at least one signal indicative of a steering intent of the driver, such as a steering wheel angle ($\delta$) and a rate of change of the steering wheel angle ($d\delta/dt$). According to an alternative to the steering wheel angle, the signal indicative of a steering intent may be an electric motor angle or a wheel angle. According to an alternative to the rate of change of the steering wheel angle, the signal indicative of a steering intent may be a rate of change of the electric motor angle or a rate of change of the wheel angle.

The signals input to the reference generator comprises at least one signal indicative of a vehicle body motion, such as lateral acceleration ($Ay$) and/or yaw rate. Such a vehicle body motion may be sensed by a sensor arranged in the vehicle.

The vehicle lateral acceleration model 14 represents a predetermined relationship between a guiding torque value and the current lateral acceleration for achieving a desired steering feel. Thus, the model 14 receives a signal indicative of a current lateral acceleration as an input signal. According to the example function shown in FIG. 1, the torque value increases dramatically for small input values of the lateral acceleration. Further, the torque value increases substantially less for larger input values of the lateral acceleration. In other words, the curve flattens out. The vehicle lateral acceleration model 14 is preferably a pure statical mapping. According to a preferred example, the vehicle lateral acceleration is the most important steering characteristic parameter.

The damping model 15 represents a predetermined relationship between a guiding torque value and the current steering wheel speed for achieving a desired steering feel. Thus, the damping model 15 preferably receives a signal indicative of a steering wheel speed (rate of change of the steering wheel position).

According to the example function shown in FIG. 1, the torque value increases dramatically for small input values of the steering wheel speed. Further, the torque value increases substantially less for larger input values of the steering wheel speed. In other words, the curve flattens out. The damping model 15 is preferably a pure statical mapping. The torque value output from the damping model is configured to act in an opposite direction with regard to the current steering wheel speed. The damping model is preferably designed so that the resulting torque is smaller for higher steering wheel speeds and higher for smaller steering wheel speeds. In this way, the damping torque is proportional to the steering wheel angle speed during normal driving and limited to a maximum value during parking or evasive maneuvers.

Thus, the vehicle lateral acceleration model 14 and the damping model 15 are linked to each other.

The self alignment model 17 represents a predetermined relationship between a guiding torque value and the current steering wheel angle for achieving a desired steering feel. By self alignment of the steering device to a neutral position is meant an active return, i.e. the return of the released steering wheel to a central setting. The self alignment model 17 preferably receives a signal indicative of the steering wheel angle and a signal indicative of vehicle speed as input signals. The purpose of the vehicle speed input signal is to be able to modulate the desired aligning torque with the current vehicle speed in a way that the self alignment torque can be reduced during high speed driving.

Regarding the friction models 16,18; a certain amount of friction feel in the steering wheel is desired. For example, Coulomb friction is desired during on-centre handling in order to achieve a desired torque build-up for small steering wheel angle deviations. Further, Coulomb friction is as well desired while driving long curves, so that the steering forces are reduced, wherein the driver can "rest" the steering wheel on the friction.

The tire model 16 comprises a hysteresis curve, which represents a tire model. Preferably, the model 16 is a dynamic model of an unrolling tire with regard to steering torque. The relation between the steering wheel angle and the torque is given by a physical relationship, where the deflection of individual rubber elements is modeled dependent on the differential angle of the steering wheel and the torsion and relaxation of the rubber elements due to the rolling tire. The resulting model yields thus a smaller hysteresis effect with increasing vehicle speed and constant steering wheel angle frequency.

The inventive method creates conditions for canceling the actual friction effect in the steering wheel resulting from the actual steering arrangement and instead applying a desired resistance torque to the steering wheel, which represents a nominal friction feel for the driver. Thus, the hardware (mechanical steering arrangement)> is decoupled from the friction steering feel. In other words, the invention creates conditions an application-independent (hardware-independent) friction steering feel.

The tire friction model 16 and the mechanical connection friction model 18 are in principle similar to each other. The tire friction model 16 represents the friction between the tire and the ground while the mechanical connection friction model 18 represents the friction in the upper steering wheel steering column assembly. Thus, a lumped frictional stiffness in the mechanical connection friction model 18 is higher than in the tire friction model 16. The tire friction model 16 preferably receives a signal indicative of a steering wheel angle and a signal indicative of vehicle speed. The mechanical connection friction model 18 preferably receives a signal indicative of a steering wheel angle.

Figure 2:
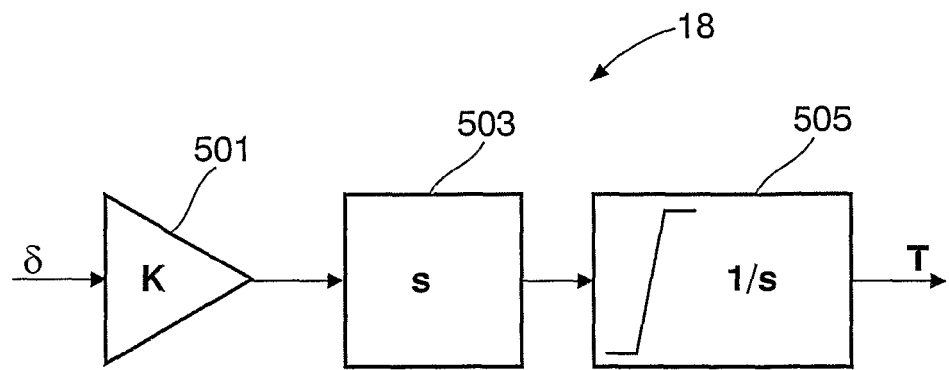
FIG. 2-3 shows an embodiment for a friction model.
Figure 3:
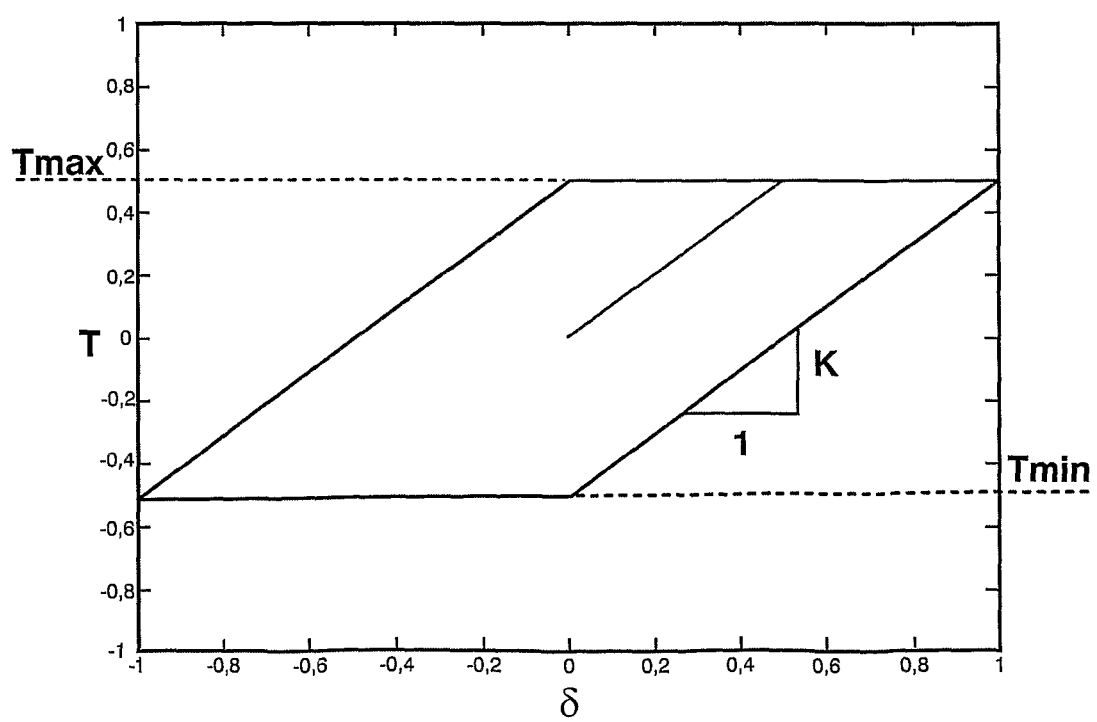

FIGS. 2-3 show in more detail an example of the friction model 16,18. The value of the steering wheel angle δ is input to a first box 501 representing a stiffness K, which corresponds to a lumped spring stiffness in Nm/Rad. The resulting value from the first box 501 is input to a second box 503 representing a derivative as indicated by the Laplace operators. The derived steering wheel angle signal, i.e. the steering wheel angle speed multiplied with the stiffness K is passed into a third box 505 representing an integrating function with anti windup functionality, indicated through the integrational limits and the inverse of the laplace transformator. The limit values are chosen in order to limit the frictional torque to the desired maximum and minimum values. The mentioned anti-windup functionality is intended to cease integration once the integrational limits are reached. The relationship, between the steering wheel angle δ and the output torque value is shown in FIG. 6.

The steering characteristic model (s) 14,15,16,17,18 is preferably designed so that a different steering characteristic parameter takes precedence over the others in different driving scenarios. According to one example, the lateral acceleration is configured to take precedence over the other steering characteristic parameters during driving in high speed. According to a further example, steering system friction and tire friction are configured to take precedence over the other steering characteristic parameters during driving in low speed. The damping torque is equally active regardless of vehicle speed. According to a further example, the self alignment is configured to take precedence over the other steering characteristic parameters during driving in an intermediate speed interval between the high speed and the low speed.

The present invention concerns a method for assisting the driver of the vehicle during operation. According to a preferred embodiment, the control method is configured to allow a control of the steering characteristics experienced by a driver of the vehicle during traveling. In other words, the control method is configured to provide the operator with a steering feel (or steering sensitivity or tactile feedback) through the steering wheel.

With regard to friction feel, according to an example embodiment, the method comprises the step of determining the desired resistance torque based on an input representing a steering angle. By determining a direction of the actual steering angle (clockwise or counterclockwise) and instantly applying a torque in the same direction, the effect of the friction in the steering arrangement can be effectively cancelled.

The steering angle is preferably determined by measuring a steering wheel deflection. Alternatively, the steering angle may be determined by measuring a wheel angle or anywhere inbetween the steering wheel and the ground engaging wheel in the mechanical steering arrangement.

The reference generator 13 and the regulating loop 12 (comprising the controllers 27,28) are preferably implemented in software.

A value of the vehicle lateral acceleration may be estimated from a measured vehicle yaw rate.

Figure 4:
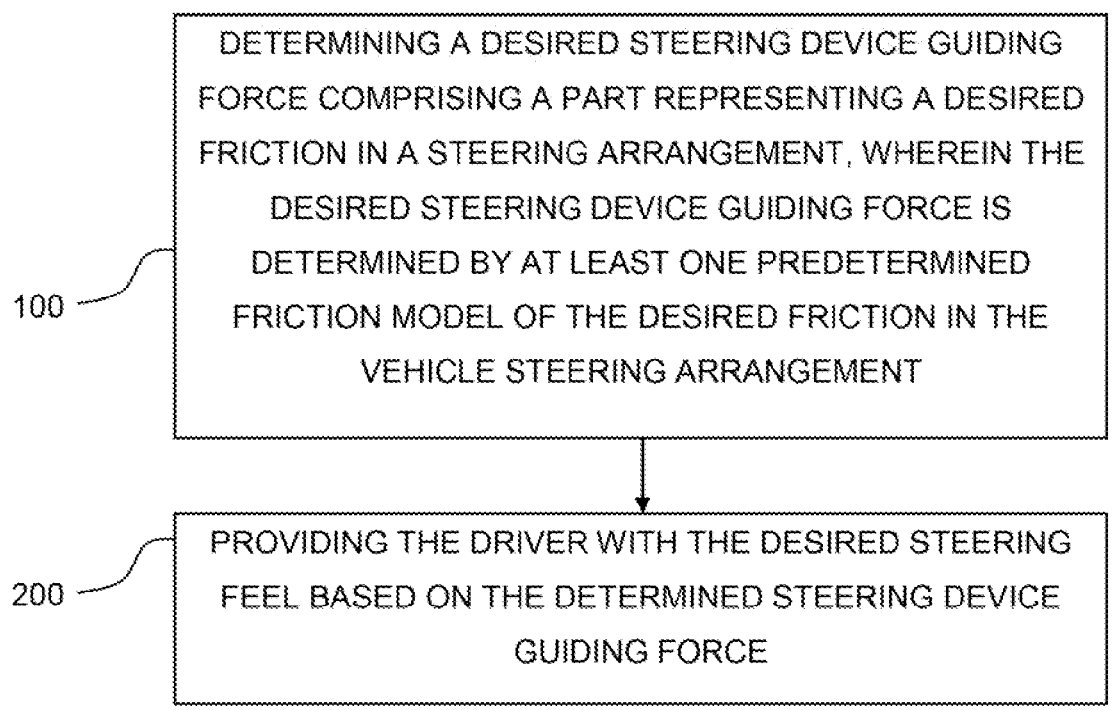
FIG. 4 shows a block diagram of steps in a method according to an aspect of the present invention.

A method for assisting a driver of a vehicle during operation by providing the driver with a desired steering feel in a mechanical steering arrangement 2 is illustrated in FIG. 4. The mechanical steering arrangement 2 can comprise a steering device 3, at least one ground engagement member 4, and a mechanical connection 5 between the steering device and the at least one ground engagement member. The method includes the steps of determining a desired steering device guiding force comprising a part representing a desired friction in a steering arrangement 2, wherein the desired steering device guiding force is determined by at least one predetermined friction model of the desired friction in the vehicle steering arrangement 100, and providing, such as via an actuator 9, the driver with the desired steering feel based on the determined steering device guiding force 200. The friction model represents friction between a flexible element 10 and the steering device 3 in the steering arrangement 2, wherein the flexible element is configured for a relative displacement in a circumferential direction about a steering axis, which displacement is generated between an upper and a lower shaft of the steering arrangement.

The invention claimed is:

1. A method for assisting a driver of a vehicle during operation by providing the driver with a desired steering feel in a mechanical steering arrangement, where the mechanical steering arrangement comprises a steering device, at least one ground engagement member, and a mechanical connection between the steering device and the at least one ground engagement member, comprising the steps of
determining a desired steering device guiding force comprising a part representing a desired friction in a steering arrangement, wherein the desired steering device guiding force is determined by at least one predetermined friction model of the desired friction in the vehicle steering arrangement, and
providing the driver with the desired steering feel based on the determined steering device guiding force,
wherein the friction model represents friction between a flexible element and the steering device in the steering arrangement, wherein the flexible element is configured for a relative displacement in a circumferential direction about a steering axis, which displacement is generated between an upper and a lower shaft of the steering arrangement.

2. A method according to claim 1, comprising providing the driver with the desired steering feel by applying a final steering device guiding force based on the desired steering device guiding force to a manually operated steering device.

3. A method according to claim 2, comprising the step of
determining an actual force to the steering device resulting from an actual vehicle steering arrangement during operation, and
determining a value of a final steering device guiding force to be applied to the steering device by subtracting a value of the determined actual force from a value of the determined desired steering device guiding force.

4. A method according to claim 1, comprising at least suppressing a driver steering feel from the influence of friction in a steering arrangement in the vehicle, which is configured to steer at least one ground engaging member.

5. A system for assisting a driver of a vehicle during operation by providing the driver with a desired steering feel in a mechanical steering arrangement, the mechanical steering arrangement comprising a steering device, at least one ground engagement member, and a mechanical connection between the steering device and the at least one ground engagement member, comprising
means for determining a desired steering device guiding force comprising a part representing a desired friction in a steering arrangement, wherein the means for determining the desired steering device guiding force comprises at least one predetermined friction model of the desired friction in the vehicle steering arrangement, and means for providing the driver with the desired steering feel based on the determined steering device guiding force,
wherein the friction model represents friction between a flexible element and the steering device in the steering arrangement, wherein the flexible element is configured for a relative displacement in a circumferential direction about a steering axis, which displacement is generated between an upper and a lower shaft of the steering arrangement.

6. A method according to claim 1, comprising the step of determining the steering device guiding force based on an input representing a steering angle.

7. A system according to claim 5, comprising means for suppressing a driver steering feel from the influence of friction in a steering arrangement in the vehicle, which is configured to steer at least one ground engaging member.

8. A system according to claim 7, wherein the means for suppressing a driver steering feel comprises a feedback loop.

9. A method according to claim 1, wherein the friction model is configured to not represent the friction between an actuator for applying the steering device guiding force to the steering device and the flexible element in the steering arrangement.

10. A method according to claim 1, wherein the flexible element forms a torsion bar.

11. A system according to claim 5, wherein the means for determining the desired steering device guiding force comprises a controller and the means for providing the driver with the desired steering feel comprises an actuator.

* * * * *